Aug. 19, 1924.
R. C. BENNER ET AL
1,505,693
BY-PASS VALVE FOR STORAGE BATTERY VENTS
Filed Oct. 12, 1922
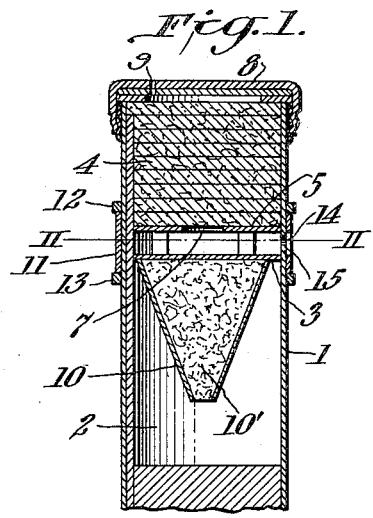
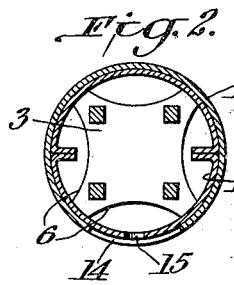
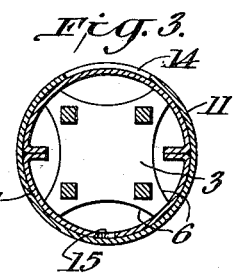
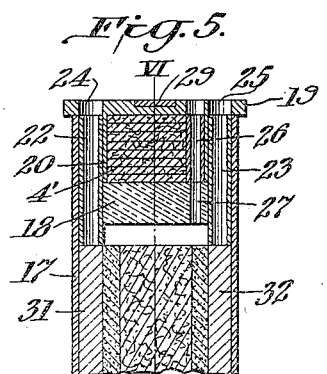
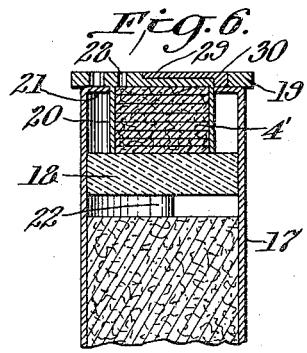
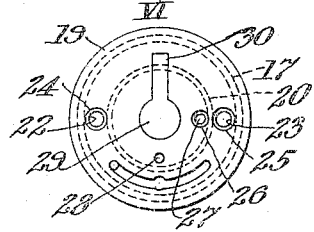
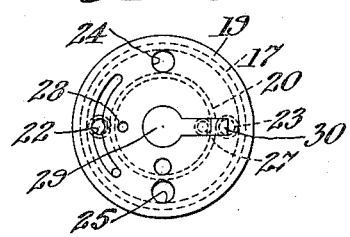
Inventors:
Raymond C. Benner,
Harry F. French,
by Byrnes, Townsend & Brickenstein,
Attorneys.

Patented Aug. 19, 1924.

1,505,693

UNITED STATES PATENT OFFICE.

RAYMOND C. BENNER, OF BAYSIDE, AND HARRY F. FRENCH, OF FLUSHING, NEW YORK, ASSIGNORS TO THE PREST-O-LITE COMPANY, INC., A CORPORATION OF NEW YORK.

BY-PASS VALVE FOR STORAGE-BATTERY VENTS.

Application filed October 12, 1922. Serial No. 594,043.

*To all whom it may concern:*

Be it known that we, RAYMOND C. BENNER and HARRY F. FRENCH, citizens of the United States, residing at Bayside and Flushing, respectively, in the county of Queens and State of New York, have invented certain new and useful Improvements in By-Pass Valves for Storage-Battery Vents, of which the following is a specification.

This invention relates to improvements in vents for storage batteries, particularly small portable batteries adapted for use in hand lamps and provided with an absorbent or the like for fixing corrosive material entrained by escaping gases. The principal object of the invention is to provide a vent so constructed that the gases pass through the absorbent during the time the battery is giving service but are divertible when the absorbent function is not needed.

During the charging of hand lamp batteries the liberation of gas is much more rapid than during discharge, and the gas carries relatively large amounts of electrolyte in the form of vapor or droplets. The escape of corrosive liquids in the amounts entrained by escaping gas is not usually objectionable under the conditions in which batteries are charged. It is accordingly permissible to divert the gases from the absorbent during the charging period and thus to prolong its service.

In accordance with the present invention, simple and effective valve constructions are provided for causing the gases to by-pass the absorbent when the escape of corrosive vapor or spray will do no harm. Reference is to be made to the accompanying drawings, in which—

Fig. 1 is a vertical section through the upper portion of a flashlight storage cell provided with a preferred form of the improved vent;

Fig. 2 is a horizontal section on line II—II, Fig. 1;

Fig. 3 is a view similar to Fig. 2, showing the by-pass valve in closed position;

Fig. 4 is a side elevation of the by-pass valve ring;

Fig. 5 is a vertical section through the upper portion of a cell provided with a modified form of by-pass valve;

Fig. 6 is a transverse section on line VI—VI, Fig. 5;

Fig. 7 is a top plan view of the device shown in Fig. 5; and

Fig. 8 is a view similar to Fig. 7, showing the by-pass valve in closed position.

Referring to Figs. 1 to 4 of the drawings, numeral 1 denotes a battery casing, constructed of celluloid or other suitable material. Casing 1 is provided with acid trap 2, baffle plate 3, and absorbent pads 4, supported upon plate 5. Plate 3 is cut away marginally at the places indicated by reference numeral 6 and plate 5 is perforated at 7. A cover 8, having a perforation 9, is screw-threaded upon the top of the casing 1. In the funnel shaped member 10 we prefer to place glass wool 10' coated with oil as described in the application of R. C. Benner, Serial No. 533,715, filed Feb. 2, 1922, though other vapor arresting materials may be used. When the battery is in service gases will pass upward through the funnel 10, through the openings 6 and 7 and the absorbent pads 4, and will escape at 9, freed from all entrained corrosive vapor or liquid.

The by-pass valve which constitutes our improvement upon the construction so far described, comprises a ring 11 encircling casing 1 at a point just below the absorbent pads 4. Ring 11 is retained in proper position by guides 12 and 13 secured to or formed on casing 1. A slot 14 is formed in the ring and is adapted to cooperate with a perforation 15 giving access through the wall of the casing to the chamber defined by plates 3 and 5. Ring 11 may be rotated to bring the slot 14 into or out of alinement with perforation 15, these positions being shown respectively in Figs. 2 and 3. When perforation 15 is closed by the ring, the gases must pass through the absorbent pads to find an exit. When that perforation is open to the atmosphere through slot 14, the gases may escape without the necessity of forcing their way through the absorbent pads.

The ring 11 preferably has good frictional engagement with the casing to insure its retaining any adjusted position. A pin 16 (Fig. 4) may be provided to run in a groove (not shown) in a portion of the bottom of guide 12, to limit the travel of the ring.

In the construction shown in Figs. 5 to 8, a casing 17 is provided with a sealing block 18, of bakelite or other suitable material, set some distance below the upper end of the casing. A rotatable head member 19 carries a depending sleeve 20 which rests upon the upper surface of sealing block 18. The head member is centered by an inturned flange 21 on casing 17 (Fig. 6).

Metallic tubes 22 and 23, adapted to receive the terminals of the source of charging current, are set in block 18 and are in alinement with the perforations 24 and 25 in head 19, when the latter is in the position shown in Figs. 5 and 7. In this position, also, tube 26, which is secured within the depending sleeve 20, is in alinement with perforation 27 formed in block 18. Gases may therefore find free escape through the tube 26 and cannot come into contact with absorbent pads 4'.

When the head 19 is turned into the position shown in Fig. 8, however, tube 26 and perforation 27 are no longer alined. Gases can then escape only by forcing their way through the absorption pads to reach the opening 28 in the cover.

With the construction described it is impossible to charge the cell without opening the by-pass formed by rotatable tube 26 and perforation 27, for the charging tubes are accessible only when the cover is so turned that parts 26 and 27 are alined.

A lead contact plate 29, adapted to cooperate with the inner terminal of a lamp bulb, is centrally secured upon the top of the cover. This plate has an arm 30 which makes contact with lead charging tube 23 when the head is turned into the position shown in Fig. 8. The charging tubes 22 and 23 are in contact with grids 31 and 32, respectively.

The present invention resides in the provision of a by-pass valve for storage cells or batteries in general, and is not limited to use with the particular arrangement of seal, absorbent, or other parts, illustrated by way of example herein. Various modifications of the valve construction to adapt it to special conditions or for other purposes may be made within the scope of the appended claims.

We claim:

1. In an electric cell provided with means adapted to fix gas-entrained substances and interposed in the normal exit path of gases evolved in the cell, rotatable valve means capable of actuation to cause the gases to by-pass the fixing means.

2. The invention according to claim 1, in which the valve means comprises a slotted ring rotatable to expose an opening through which gases may find a direct exit.

3. An electric cell comprising a casing having a plurality of vents for gases, an absorbent interposed in the path of gases passing to one of said vents, another of said vents lying between the absorbent and the gas generating elements of the cell, and means adapted to close said last mentioned vent when gases from the cell are to be discharged through the absorbent.

4. An electric battery comprising a casing, a cover therefor having a vent, an absorbent beneath the cover and adapted to fix material entrained by gases passing to the vent, a perforation beneath said absorbent, and means normally closing said perforation but capable of actuation to uncover the same and permit the escape of gases therethrough.

In testimony whereof, we affix our signatures.

RAYMOND C. BENNER.
HARRY F. FRENCH.